United States Patent [19]

Johnstead

[11] Patent Number: 4,658,488

[45] Date of Patent: Apr. 21, 1987

[54] DRIVE-LINE PULLER

[76] Inventor: Park L. Johnstead, 2404 SE. Gladstone, Portland, Oreg. 97202

[21] Appl. No.: 706,656

[22] Filed: Feb. 28, 1985

[51] Int. Cl.⁴ ..................... B23P 19/04
[52] U.S. Cl. ..................... 29/259
[58] Field of Search ..................... 29/259, 258, 260, 266, 29/262

[56] References Cited

U.S. PATENT DOCUMENTS

| | | | |
|---|---|---|---|
| 1,469,076 | 9/1923 | Faber | 29/259 |
| 1,513,031 | 10/1924 | Brown | 29/259 |
| 2,257,318 | 9/1941 | Wilborn | 29/262 |
| 2,992,478 | 7/1961 | Baker . | |
| 3,076,259 | 2/1963 | Stebbins . | |
| 3,142,897 | 8/1964 | Davis | 29/259 |
| 3,487,528 | 1/1970 | Shultz . | |
| 3,579,796 | 5/1971 | Fillion . | |
| 4,019,233 | 4/1977 | Jirele . | |
| 4,123,838 | 11/1978 | Magavero . | |
| 4,343,075 | 8/1982 | Guptill et al. | 29/258 |
| 4,463,489 | 8/1984 | James | 29/259 |
| 4,570,319 | 2/1986 | Skoworodko | 29/259 |

OTHER PUBLICATIONS

"POSI Lock" ad slick by Octagon Tool, Inc., 7/84.

Exhibit B, Photograph of sketch of "U-Joint Magic" universal joint pulling tool.

*Primary Examiner*—Robert C. Watson
*Attorney, Agent, or Firm*—Klarquist, Sparkman, Campbell, Leigh & Whinston

[57] ABSTRACT

A tool for uncoupling a drive member and driven member joined together at a universal joint includes a pulling member and pushing member, both having a substantially U-shaped configuration such that they are disposed in nested relationship with the pushing member substantially surrounding the pulling member. In one embodiment, both such members are coupled together by a threaded drive member rigidly secured to the pulling member. The drive member threadably receives a nut, rotation of which causes the nut to bear against the pushing member to urge the pushing member in one direction and simultaneously urge the pulling member in the opposite direction. In operation, the pull member exerts a pulling force on an end yoke of, for example, the drive member, which seats by interference fit a press fit bearing to be removed, while the pushing member exerts a pushing force against an end yoke of the driven member. Thus, the end yoke of the drive shaft is urged toward the tool as the end yoke of the driven shaft is urged away from the tool, releasing one of the bearings seated by the drive shaft end yoke from its interference fit.

8 Claims, 6 Drawing Figures

DRIVE-LINE PULLER

FIELD OF THE INVENTION

The present invention relates to tools and more particularly to tools for disassembling universal joints and the like.

BACKGROUND OF THE INVENTION

Trucks and heavy equipment, as well as some smaller machines, require drive trains to transmit power from a drive or input member to a driven or output member. For example, power may be transmitted from a transmission to a drive shaft, then to a differential and finally to a wheel. A truck with a long wheel base may require plural interconnected drive shafts between the transmission and differential. Components of the drive train, including drive shaft(s), transmission and differential, are typically coupled to one another by a universal joint. A large vehicle may have a drive train with as many as five universal joints.

It is sometimes necessary to uncouple one or more of the drive train (or drive line) components. For example, when a tractor trailer is towed, it is highly desirable to disconnect the drive shaft from the differential to render the transmission inactive. Otherwise, the transmission, which is unlubricated, might be damaged. Further, it may be necessary to uncouple one or more universal joints to repair or replace the components of the drive train or other components of the vehicle/machine.

The universal joint typically includes a cross shaft, with four radially extending trunnions, to which respective end yokes of the drive and driven members are connected. Each end yoke has a pair of yoke arms, each of which is secured to one of the trunnions of the cross shaft by a press fit bearing. The yoke arm acts as a collar to seat the bearing. Each press fit bearing, which includes an oval flange portion, is secured in place by its interference or press fit between the trunnion and yoke arm and by threaded studs securing the flange portion against the yoke arm. The bearings mounting the drive and driven members to the trunnions permit such members to pivot about their respective trunnions as rotary power is transmitted from the driving member to the driven member via the cross shaft. Thus, the universal joint permits power to be transmitted to a remote location not necessarily aligned linearly with the original source of power.

Even with the studs removed, it is frequently difficult to remove the bearings from their respective yoke arms because of their "press fit", a condition exacerbated with field used bearings due to swelling, rust and various other infirmities which lock them even more firmly in place. Moreover, it is virtually impossible to get a pulling or prying tool between the bearing flange and yoke arm to pry the bearing out of the yoke arm without damaging the bearing, yoke arm or both.

Several attempts have been made to solve this problem. One common approach is to hit, for example, the drive shaft with a maul or hammer to shift the drive shaft relative to the cross shaft and hopefully dislodge one of the press fit bearings from its "locked" position on the trunnion. This approach often results in damage to the drive shaft and usually is not successful. In fact, this approach is only successful if the bearing's interference fit is already fairly loose because of vibration or wear and tear on the interference surfaces of the yoke arm and bearing.

Another approach is to rotate the cross shaft until the end yoke of, for example, the drive shaft is disposed upright and then apply an upward force to the underside of the driven shaft with a jack. In theory, the weight of the truck will resist the upward force of the jack and cause the uppermost bearing of the upright end yoke to be dislodged. However, the forces locking the bearing in place are sometimes so large that the jack actually lifts the truck off the ground without dislodging the bearing from its interference fit.

Various tools have been designed in response to this problem, but they too have certain disadvantages.

One such tool is disclosed in Jirele U.S. Pat. No. 4,019,233. This tool operates to remove the press fit bearing of, say, the drive shaft by pushing the drive shaft end yoke in one direction and pulling the driven shaft end yoke in the opposite direction. Preliminary thereto, however, the studs fastening each bearing to its respective yoke arm are removed. Then, a "connect block" is secured to the yoke arm of the bearing to be removed by a pair of elongate studs which pass through openings in the bearing's flange portion and enter threaded bores of the yoke arm. In effect, such elongate studs replace the two studs that are removed from such yoke arm. Similarly, special side plates are mounted to both yoke arms of the driven shaft end yoke to provide gripping bosses for "puller arms" of the tool.

The puller arms and connect block are connected to a common, threaded drive stud, rotation of which causes a leveraged force to be exerted on the puller arms and connect block, and hence driven shaft end yoke and drive shaft end yoke, urging them in opposite directions. This in turn forces the one drive shaft bearing out of its yoke arm. The procedure is then repeated for the other bearing of the drive shaft. Once both bearings of the drive shaft are removed, it is unnecessary to use the side plates to remove the bearings of the driven shaft because the puller arms can engage directly the freely accessible trunnions of the cross shaft.

This tool has a time-consuming set-up procedure which is undesirable. It is costly to manufacture and more susceptible to operating problems because of the number of parts required, which is undesirable. Also, it applies a substantial force at the stud-receiving threaded bores of the yoke arm which could damage the same. Moreover, the tool requires a different connect block and set of side plates for each different universal joint, or at least a connect block and set of side plates specially adapted for use with yoke arms having varying spacings between their threaded bores.

A somewhat similar tool is disclosed in Stebbins U.S. Pat. No. 3,076,259. This tool includes a main body with opposed outwardly extending pins, puller leg supported by each pin, drive stud threadably engaged by the main body, and yoke arm engaging cup connected to one end of the stud. Like the Jirele tool, when the stud is rotated, a pushing force is exerted (by the cup) on the yoke arm of, for example, the drive shaft while a pulling force is exerted (by the puller legs) on the yoke arms of the driven shaft.

This tool will not work with a press fit bearing having a flange portion which overlies the yoke arm, as earlier described, and hence has limited utility. Moreover, the puller legs of this tool must be reversed once the press fit bearings of one shaft have been dislodged to remove the bearings of the other shaft. This is a time-consuming step which makes the uncoupling procedure less efficient. Finally, this tool requires a different set of puller legs for each universal joint of different size.

Baker U.S. Pat. No. 2,992,478 discloses a push-pull tool for removing axles. This tool appears to be unsuited for uncoupling universal joints of any type.

Other push-pull tools of questionable relevance are disclosed in Magavero U.S. Pat. No. 4,123,838; Shultz U.S. Pat. No. 3,487,528; Fillion U.S. Pat. No. 3,579,796; and Faber U.S. Pat. No. 1,469,076. These patents disclose tools for pulling plumbing handles, pulling valve stems and compressing springs, and hence do not appear to be directed to a problem even analogous to that addressed by the present invention.

Accordingly, there is a need for an improved drive-line puller that is simple, effective, relatively inexpensive to manufacture, efficient and easy to set up.

SUMMARY OF THE INVENTION

The present invention is an improved tool for uncoupling end yokes joined to a cross shaft by press fit bearings or the like. The bearings are seated by collar portions of the end yokes, which serve to couple together components of a drive line (train), such as drive/driven shafts, transmission yoke, differential yoke and drive axle. The invention includes a pulling means adapted for unsecured abutting contact with one of the collar portions of a first end yoke and pushing means adapted for unsecured abutting contact with at least one collar portion of a second end yoke. Coupling means are provided to couple the pushing and pulling members together while permitting relative movement therebetween. A force applying means applies a force to the pulling and pushing means urging the pulling means in one direction and the pushing means in the opposite direction, such that the pulling means exerts a pulling force on the first end yoke and the pushing means exerts an opposite pushing force on the second yoke.

In a preferred embodiment, the pulling and pushing means have a substantially U-shaped configuration and are disposed in nested relationship with the pushing means substantially surrounding the pulling means. The force applying means includes a threaded drive member intercoupling the pushing means and pulling means. The drive member is secured to the pulling means such that it is not free to rotate. The force applying means also includes a nut threadably engaged by the drive member, which when rotated bears against the pushing means to urge the pushing means in one direction as the drive member responsively urges the pulling means in the opposite direction.

It is therefore an object of the present invention to provide an improved drive-line puller of simplified construction, with few parts, that is relatively inexpensive to manufacture.

Another object of the invention is to provide a drive-line puller that is reliable and effective, even when used to remove particularly stubborn press fit bearings.

A further object of the invention is to provide a drive-line puller that can be quickly and easily set up.

Still another object of the present invention is to provide a drive-line puller suitable for effectively and efficiently removing a press fit bearing having a flange portion which overlies the yoke arm that seats it.

A further object of the present invention is to provide a drive-line puller that requires no special yoke arm attachments.

Another object of the present invention is to provide a drive-line puller that does not have to be fastened to the universal joint in any way.

Yet another object of the present invention is to provide a drive-line puller that minimizes the risk of damage to the universal joint, particularly the yoke arms.

Other objects and advantages of the invention will become apparent from the following detailed description and with reference to the accompanying drawings.

DETAILED DESCRIPTION OF A PREFERRED EMBODIMENT

Environment

Figure 1:
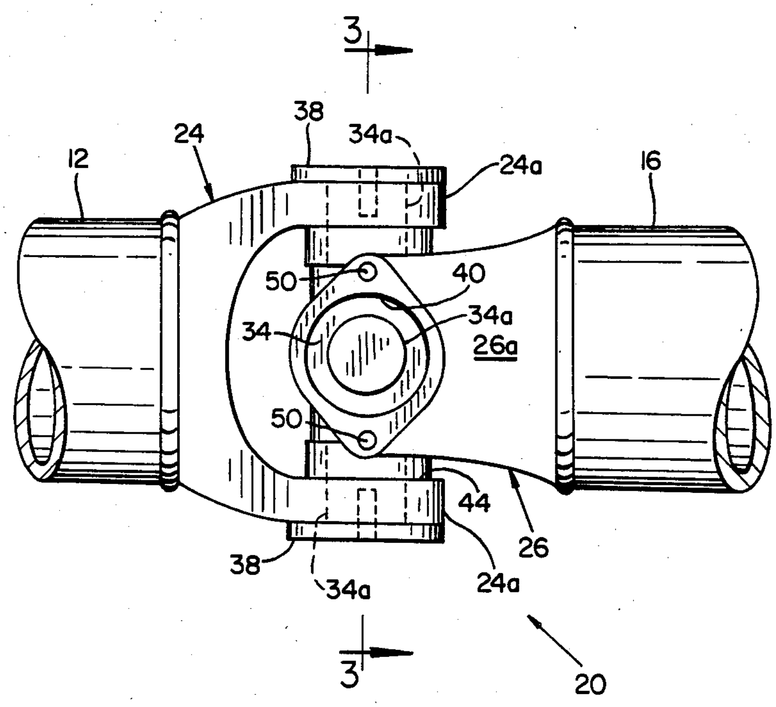
FIG. 1 is a front view of a drive shaft and driven shaft coupled together at a universal joint, with one press fit bearing of the universal shaft removed.

Referring to FIG. 1, a drive shaft 12 and driven shaft 16, coupled together at a universal joint 20, each terminate at a yoke member 24, 26 respectively. Each yoke member 24, 26 includes a pair of opposed yoke arms or collars *24a, 26a*, respectively. Drive shaft 12 and driven shaft 16 are coupled together by a cross shaft 34 having four radially extending trunnions *34a*, one opposed pair for mounting the drive shaft and the other opposed pair for mounting the driven shaft. Each collar *24a, 26a* is mounted to one of the trunnions by a press fit bearing 38. Each bearing and collar which seats it are sized for interference fit therebetween.

Each collar *24a, 26a* has a cylindrical bore wall 40 (FIGS. 1, 4), flat outer surface 42 (FIGS. 4 and 5), flat inner surface 44 (FIGS. 1, 3–6) and opposed side surfaces 46 (FIGS. 3, 4, 6) extending between the outer and inner surfaces. Each collar is securely mounted to the cross shaft by the interference fit of the bearing and by a pair of threaded studs (not shown) received by respective threaded openings 50 in the collar. The studs pass through aligned openings in an oval flange portion of the collar to secure such flange portion against the outer surface of the collar.

Embodiment of FIGS. 2–5

Figure 2:
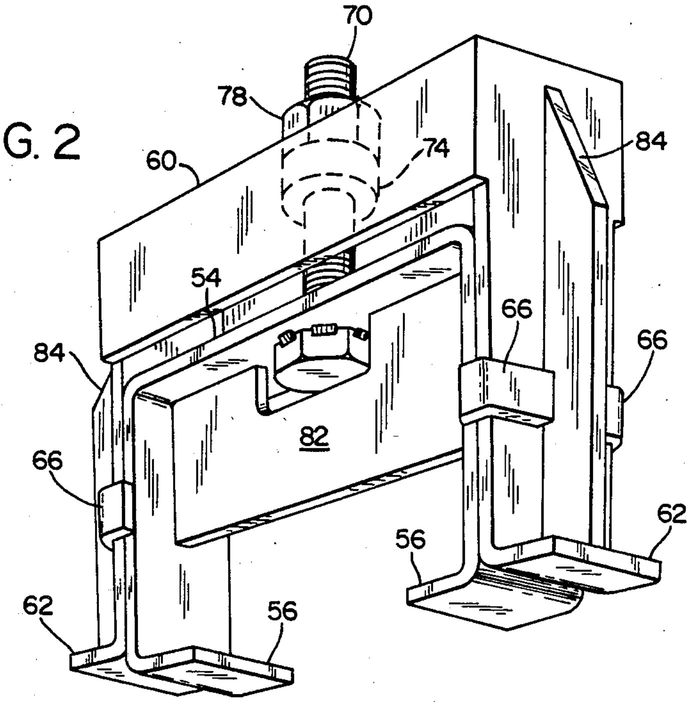
FIG. 2 is a perspective view of a drive-line puller in accordance with one embodiment of the present invention.

Referring to FIG. 2, the present invention includes a U-shaped pull member 54 having two leg portions, each of which terminates at an inwardly turned flange 56. It further includes a U-shaped push member 60 having two leg portions, each of which terminates at an outwardly turned flange 62. Push member 60 surrounds pull member 54 on three sides such that the two members are disposed in nested relationship yet able to move axially relative to one another. The leg portions of the pull member are preferably in loose sliding contact with the leg portions of the push member.

A pair of guide clips 66, welded or otherwise fastened to each leg portion of the pull member, wrap around the adjacent leg portion of the push member. They serve to keep the pull member and push member axially aligned with one another, thereby permitting only axial relative movement therebetween. They also serve to prevent such members from becoming detached from one another and to prevent the leg portions of the push member from spreading apart.

A force applying means is provided which causes a leveraged force to be exerted on the push and pull members, urging one member in one direction and the other member in the opposite direction. The force applying means includes a threaded drive member 70, collar 74 welded or otherwise secured to push member 60, and nut 78. Drive member 70 has a head welded or otherwise secured to a central portion of pull member 54 and hence does not rotate. The drive member has a threaded shank portion which extends through an opening in the pull member and then through a bore defined by collar 74. The shank portion terminates at a distal end which receives nut 78. The nut threads freely onto the shank portion until it abuts collar 74, at which time continued rotation of the nut forces the head of the drive member to move axially toward the collar. As such head and hence pull member is urged toward the collar, the nut bears against the collar to urge it and hence the push member in the opposite direction. In this way, a substantial push-pull force combination can be applied by the push and pull members due to the leverage afforded by the threaded drive member, as multiplied by the added leverage of the wrench or other torque applying tool used to rotate the nut.

A support plate 82 welded to the pull member between its leg portions and gussets 84 welded to the leg portions of the push member provide added structural rigidity.

Figure 6:
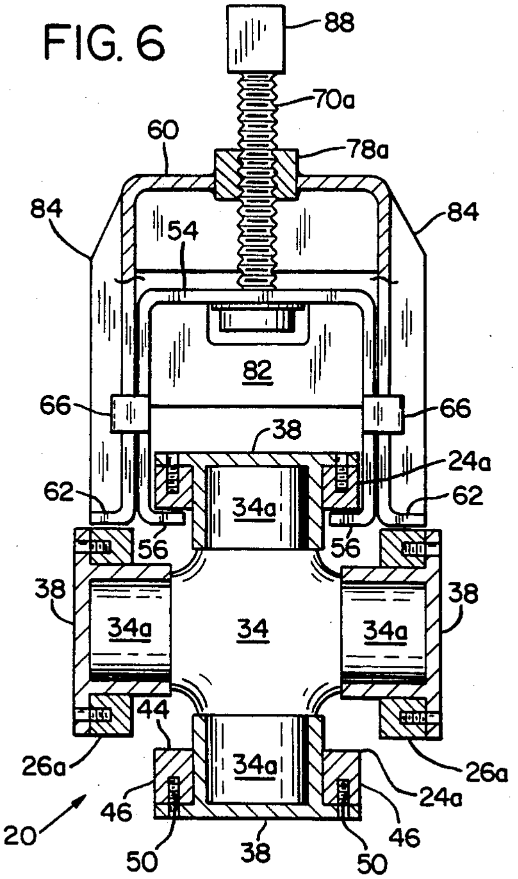
FIG. 6 is a view similar to FIG. 3 showing another embodiment of the present invention.

Embodiment of FIG. 6

The embodiment of FIG. 6 is identical to the embodiment just described, except for the force applying means. The force applying means shown in FIG. 6 includes a threaded drive member **70*a* having a head at one end and a lug portion 88 at the other end suited for engagement by a wrench or other torque-applying tool. Unlike drive member 70, drive member 70*a* is not welded to the pull member and hence is free to rotate about its axis. The force applying means also includes a nut 78*a* welded or otherwise secured to the push member, which threadably receives drive member 70*a*. Unlike nut 78, nut 78*a*** is not free to rotate.

A torque applied at lug portion 88 causes drive member **70*a* to rotate and bear against nut 78*a***, urging the push and pull members toward or away from one another depending upon the direction of the torque applied to the lug portion.

Both embodiments are preferably made of a tool steel or other hard steel, which may be heat treated, to provide a tool of high tensile stress and hardness. Either embodiment may be formed in conventional ways, such as by fabricating, drop forging or casting. Drop forging or casting is preferred.

Operation

Figure 3:
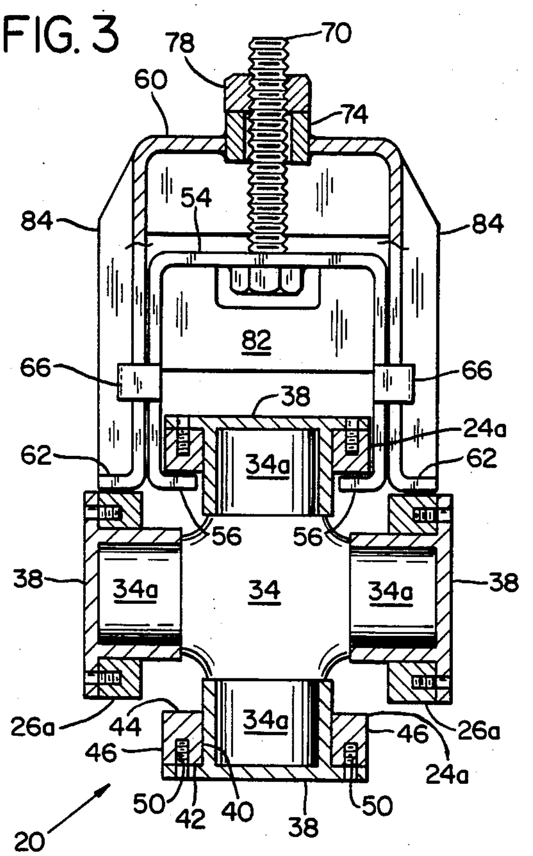
FIG. 3 is a sectional view taken along line 3—3 of FIG. 1, additionally showing the invention of FIG. 2 in position to remove a press fit bearing of the universal joint. The one press fit bearing omitted from FIG. 1 is also shown.
Figure 4:
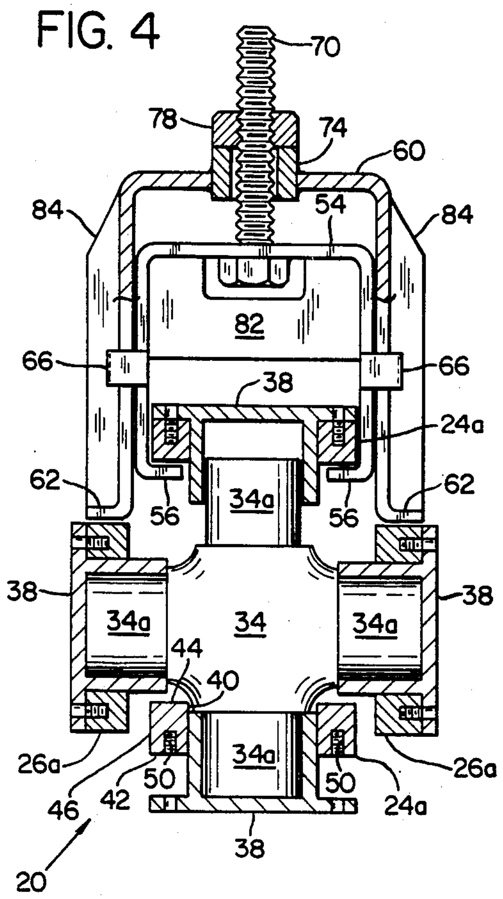
FIG. 4 is a partially sectional view similar to FIG. 3 showing the universal joint after one press fit bearing has been loosened.
Figure 5:
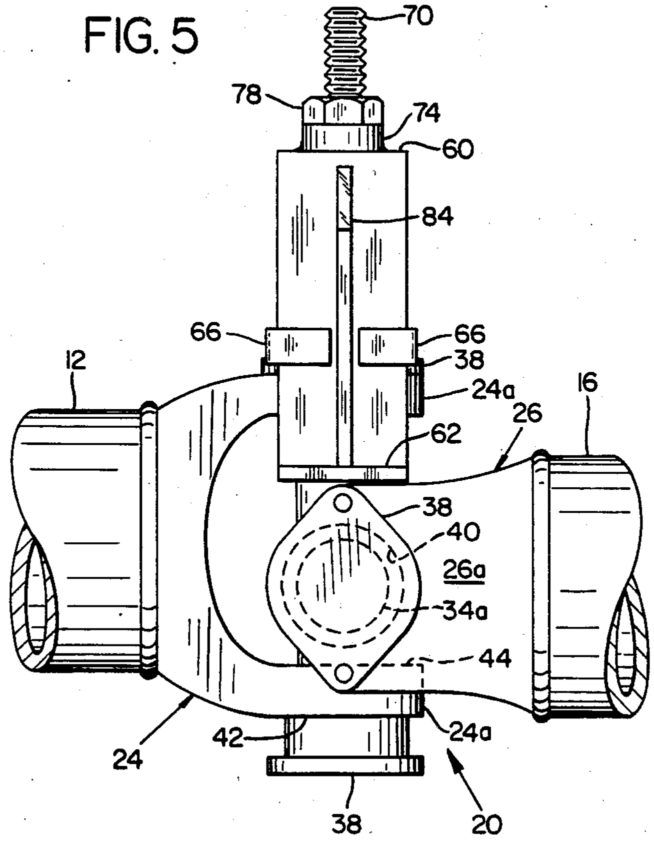
FIG. 5 is a view similar to FIG. 1, additionally showing the invention as it appears after a press fit bearing has been loosened. Unlike FIG. 1, no bearings have been omitted.

As best shown in FIGS. 3, 4 and 6, to remove one of the bearings of, for example, the drive shaft, the studs of both drive shaft bearings are unfastened. Similarly, if the driven shaft is to be uncoupled, its bearing studs must be unfastened. Then, the tool is set up with the flanges of the pull member in engagement with the inner surface of the collar seating the bearing to be removed. Similarly, each flange of the push member is placed in abutment with the side surface of one of the collars of the driven shaft, such that both collars of the driven shaft are engaged.

In the case of the embodiment of FIGS. 2–5, the operator applies a torque to the nut with a wrench, causing the push member to push against the driven shaft end yoke (in one direction) as the pull member simultaneously urges the drive shaft end yoke in the opposite direction. As a result, the pull member pulls the collar and bearing seated thereby radially outwardly and hence the opposite collar of the drive shaft radially inwardly. The bearing seated by such opposite collar is prevented from moving radially inwardly with its collar because its flange portion abuts the trunnion. Eventually, such opposite collar is pulled free of the end of the bearing, releasing such bearing from its interference fit. The bearing is then easily slid axially off the trunnion. During this procedure, the drive shaft collar directly engaged by the pull member may be pulled so far as to pull its seated bearing off the trunnion. Whether that occurs or not, after the opposite drive shaft bearing is removed, the still seated bearing is pushed back onto its associated trunnion.

The procedure is then repeated for the still seated drive shaft bearing by installing the tool such that it engages the opposite collar of the drive shaft, which no longer seats a bearing, to permit the yoke member of the drive shaft to be uncoupled from the cross shaft. If it is then desired to uncouple the driven shaft from the cross shaft, the above procedure is repeated. Of course, the driven shaft can be uncoupled from the cross shaft without uncoupling the drive shaft.

The embodiment of FIG. 6 operates similarly, except that the threaded drive member itself is rotated by applying a torque at the lug portion of the drive member.

It will be appreciated that the present invention can be quickly and easily set up to remove the press fit bearings of a universal joint. It requires no special end yoke attachments and is not fastened to the end yokes or bearings in any way.

Further, the flanges of the push and pull members merely abut the end yokes of the universal joint, bearing against such end yokes to urge the drive shaft in one direction and the transmission shaft in the opposite direction. Thus, there is virtually no risk of damaging the threaded bores of the end yoke collars or any other parts of the universal joint, even though very large forces are applied. Also, the risk of damage attendant with using a hammer or prying tool to remove the bearings is minimized. In the most severe cases, it may be necessary to supplement the force applied to the universal joint by the invention with a moderate tapping force applied to either the drive or driven shafts to release the frozen bearing.

Because the invention does not make use of the threaded bores of the end yoke collars, which have predetermined spacings, the invention may be used universally with end yokes of different sizes (within a wide specified range). Obviously, if commercially available end yokes vary greatly in size, tools of different sizes may be required to adequately handle all such end yokes.

Part of the unique simplicity of the present invention is due to the manner in which the forces are applied to the universal joint. With the present invention, the end yoke seating the bearing to be dislodged is urged toward the tool while the other end yoke is urged away from the tool. The tools of U.S. Pat. Nos. 3,076,259 and 4,019,233 teach just the opposite.

Although the operation of the present invention has been described with reference to a universal joint coupling a drive shaft and driven shaft, the invention works equally well with many other universal joints coupling together, for example, a transmission yoke and drive shaft yoke, or drive shaft yoke and differential yoke.

Having illustrated and described the principles of my invention with reference to one preferred embodiment, it should be apparent to those persons skilled in the art that such invention may be modified in arrangement and detail without departing from such principles. I claim as my invention all such modifications as come within the true spirit and scope of the following claims.

I claim:

1. In combination with a universal joint including first and second yoke members, each having a pair of opposed first and second collars which seat respective press fit bearings, and a cross shaft cooperating with said bearings to mount said yoke members, an apparatus for removing said press fit bearings comprising:

pulling means adapted for unsecured abutting contact with said first collar of said first yoke member;

pushing means adapted for unsecured abutting contact with both said collars of said second yoke member;

coupling means for coupling said pushing and pulling means in nested relationship with said pushing means being laterally outboard of said pulling means, while permitting relative movement therebetween;

force applying means urging said pulling means and said pushing means in opposite directions to cause said pulling means to exert a pulling force on said first collar of said first yoke member and said pushing means to exert an opposite pushing force on both said collars of said second yoke member, thereby to force the press fit bearing seated by said second collar of said first yoke member out of its bearing seat to facilitate its removal.

2. An apparatus according to claim 1 wherein said pulling and pushing means each have a substantially U-shaped configuration.

3. An apparatus according to claim 1 wherein each said collar includes an inner surface facing said cross shaft, opposed outer surface, bore wall for seating one of said bearings, and opposed side surfaces, said pulling means having first flange means for engaging said inner surface of one said collar of said first yoke member, said pushing member having second flange means for engaging one said side surface of both said collars of said second yoke member.

4. An apparatus for removing press fit bearings from a universal joint including first and second yoke members, each having a pair of opposed collars seating said bearings, and a cross shaft cooperating with said bearings to mount said yoke members, the apparatus comprising:

pulling means adapted for unsecured abutting contact with one said collar of said first yoke member;

pushing means adapted for unsecured abutting contact with both said collars of said second yoke member;

coupling means for coupling said pushing and pulling means while permitting relative movement therebetween;

force applying means for applying a force to said pulling and pushing means urging said pulling means in one direction and said pushing means in the opposite direction, such that said pulling means is capable of exerting a pulling force on one said collar of said first yoke member and said pushing means is capable of exerting an opposite pushing force on both said collars of said second yoke member;

each said collar including an inner surface facing said cross shaft, opposed outer surface, bore wall for seating one of said bearings, and opposed side surfaces, said pulling means having first flange means for engaging said inner surface of one said collar of said first yoke member, said pushing member having second flange means for engaging one said side surface of both said collars of said second yoke member;

said first flange means including a pair of opposed inwardly turned flanges and said second flange means includes a pair of opposed outwardly turned flanges.

5. An apparatus according to claim 1 wherein said force applying means includes a threaded drive member and nut in threaded engagement with said drive member.

6. An apparatus according to claim 5 wherein said drive member includes a head at one end in abutting contact with said pulling means and means at the other end to which a torque may be applied, said nut being rigidly secured to said pushing means.

7. An apparatus according to claim 1 wherein said force applying means and coupling means include a common threaded drive member.

8. An apparatus according to claim 7 wherein said drive member has a head rigidly secured to said pulling means and said pushing means includes collar means surrounding said drive member, said force applying means further including a rotatable nut in threaded engagement with said drive member and in abutting contact with said collar means.

* * * * *